F. E. DEULIN.
METHOD AND APPARATUS FOR DRAWING SHEET GLASS.
APPLICATION FILED DEC. 21, 1918.

1,411,079.

Patented Mar. 28, 1922.

Inventor
Fernand E. Deulin

By Whittemore Hulbert & Whittemore
Attorneys

UNITED STATES PATENT OFFICE.

FERNAND E. DEULIN, OF CHARLESTON, WEST VIRGINIA, ASSIGNOR TO THE LIBBEY-OWENS SHEET GLASS COMPANY, OF CHARLESTON, WEST VIRGINIA, A CORPORATION OF OHIO.

METHOD AND APPARATUS FOR DRAWING SHEET GLASS.

1,411,079.

Specification of Letters Patent. Patented Mar. 28, 1922.

Application filed December 21, 1918. Serial No. 267,770.

*To all whom it may concern:*

Be it known that I, FERNAND E. DEULIN, a citizen of the United States of America, residing at Charleston, in the county of Kanawha and State of West Virginia, have invented certain new and useful Improvements in Methods and Apparatus for Drawing Sheet Glass, of which the following is a specification, reference being had therein to the accompanying drawings.

This invention relates to the art of drawing sheet glass, and has for its object to provide a method and apparatus capable of producing a superior quality of drawn glass free from wave-lines or corrugations and having a fine unmarred fire-finish or glaze.

In drawing sheet glass vertically and then turning it over a bending roll from a vertical to a horizontal position, one of the most difficult problems is to prevent the surface of the glass becoming marred by contact with the bending roll and having formed therein corrugations or waves which materially diminish the quality of glass and its market value. If the glass is too hot when it is brought into contact with the bending roll, the surface glaze or finish of the glass is injured by the roll; on the other hand, when the glass is too cool in passing over the roll, corrugations are formed in the glass which it is difficult to entirely eliminate from the finished product.

Figure 1:
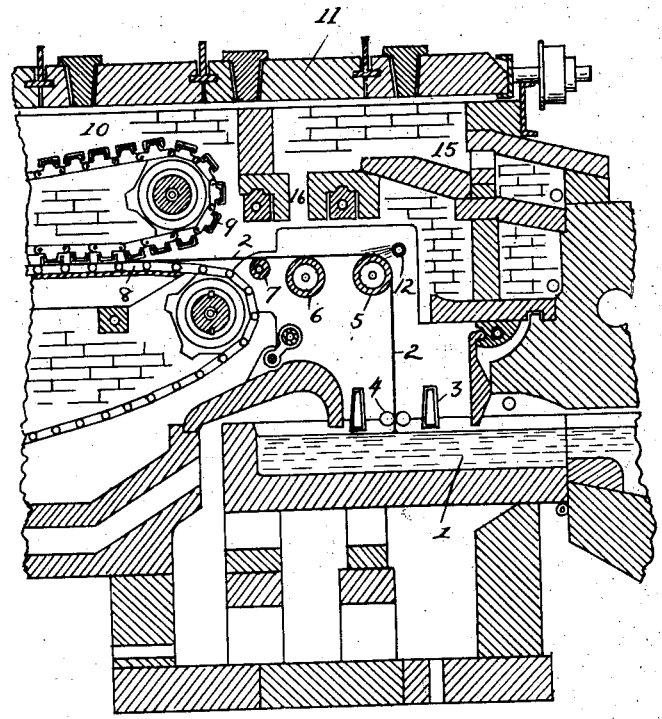
Figure 2:
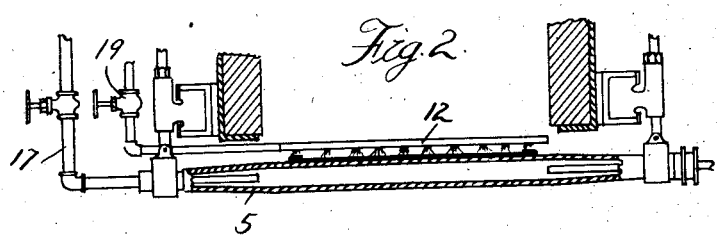

The present method and apparatus produce glass with a better finish and with less marring of the surface and less wavy glass than any heretofore employed. The invention consists in drawing the glass vertically, during which period it is permitted to cool to a point where it will not take impressions from the bending roll and hence will not be marred thereby, then bending the glass over the bending roll from a vertical into approximately horizontal position, and, just before it leaves the bending roll, re-heating the sheet while still under drawing tension, whereby the formation of corrugations or waves is either prevented or such corrugations and waves as may have been formed are eliminated. This method of procedure is capable of being carried out with various forms of apparatus, one of which, for the purpose of illustrating the invention, is shown in the accompanying drawings, in which:

Fig. 1 is a vertical longitudinal section through a glass drawing apparatus which is capable of carrying out the method indicated; and Fig. 2 is a cross-section, parts being shown in elevation, showing the bending roll and a burner for applying heat to the glass as it leaves the roll.

The apparatus herein illustrated in general is that described and shown in United States Letters Patent 1,248,809, to Irving W. Colburn, modified to set forth the present improvement.

In the apparatus of said patent, there is a tank 1 for the molten glass from which the sheet 2 is drawn vertically. This tank has suitable heating means for maintaining the glass at drawing temperature and preferably is provided with water coolers 3 and with suitable width-maintaining devices, as the edge-holding rolls 4. A hollow bending roll 5 is provided above the tank over which the sheet is turned from vertical to an approximately horizontal position, intermediate supporting rolls 6 and 7 being preferably placed between the bending roll 5 and a drawing mechanism comprising the drawing table 8 co-acting with grip bars 9. This drawing mechanism grips the sheet along its edge portions and draws it horizontally and delivers it into a leer (not shown). This mechanism is all enclosed by brick-work casing having side walls 10 and top 11, its side walls having vertical openings to the external atmosphere opposite the drawing point, so that the sheet is drawn vertically practically in the open air. The top and upper sections of the side walls form an arch at this point as will be clearly understood from the drawings.

The operation of this apparatus is well described in said Patent 1,248,809 and other patents to the same inventor; the sheet being drawn up and over the bending roll and then horizontally therefrom by the drawing mechanism, the width being maintained by the edge rolls 4, so that this drawing mechanism need not be here more fully described.

In the practice of the present invention, the sheet is drawn up to the bending roll and the temperature between the drawing point and the bending roll is so adjusted as to permit the drawn sheet to cool from the drawing point upwards until it is hard enough so that it will not be marred by contact with said roll. Ordinarily, this can be accomplished by the omission of any heating means between the surface of the molten glass in the tank 1 and the bending roll so that the heat about the vertical run of the sheet is due only to what products of combustion escape from the furnace of the heating tank beneath, plus the radiation from the glass in the tank and the drawn sheet.

When the glass is thus cooled in its vertical run, it is liable to be so stiff that it will tend, upon leaving the bending roll, to maintain the curvature imparted thereto by said roll to such an extent that pull of the drawing mechanism on the sheet will not effectually straighten it and there will be more or less wave-lines or corrugations imparted to the sheet at the bending roll.

Under the present invention, the sheet is re-heated as soon as it is turned to the horizontal and approximately at the point where it leaves the bending roll. Any suitable means for applying the required degree of heat at the point indicated may be employed. As here shown, this is accomplished by arranging adjacent to the bending roll a pipe 12 extending transversely across the drawing chamber, said pipe being slotted or perforated so that gas may be fed therefrom to produce a flame directed upon the surface of the sheet and extending practically from edge to edge thereof, the flame being so directed as to impinge upon and heat the sheet just prior to its leaving and just as it leaves the roll. By means of this flame, the sheet is re-heated to such an extent that the drawing table tension pulls it perfectly straight, overcoming the curvature tendency mentioned above. The flow of gas to the burner pipe 12 is controlled by any suitable means, as the valve 19, Fig. 2.

Preferably, heat is also applied to the horizontal run of the glass, well beyond the bending roll, from the combustion chamber 15 through a passage 16 leading from said chamber 15 down to a point immediately over the horizontal run of the sheet, whereby the temperature of the sheet is raised to a point where it may be readily and completely flattened. When the burner 12 is used, however, less heat is needed to be supplied through the passage 16 to raise the temperature of the sheet to the flattening condition.

Any suitable means may be employed to prevent the bending roll 5 from becoming overheated, such, for example, as maintaining an air current through the hollow roll. For this purpose, pipes 17 are provided (one of the pipes being shown in Fig. 2), leading to the interior of the roll for forcing air therethrough.

The operation of the apparatus and the practice of the method will be readily understood by those familiar with the art. By proceeding in accordance with the method described, the glass will bend over the bending roll without surface imperfections and be drawn to the horizontal with the elimination of waves, corrugations or transverse bends so that perfectly flat glass of high grade is produced in sheet form.

What I claim as new and desire to secure by Letters Patent is:

1. In the art of drawing sheet glass in which the sheet is first drawn vertically and then bent to horizontal position over a bending roll, the improvement which consists in cooling the sheet in its vertical run to the point where it will not be marred by contact with the roll but would become transversely corrugated when bent over the roll, and then reheating the sheet to soften the same at the point where it leaves the bending roll and applying draft to the horizontal run of the sheet beyond the bending roll thus forestalling the formation of corrugations.

2. The method of drawing sheet glass, which consists in drawing a sheet of glass vertically from a mass of molten glass, and bending the sheet from the vertical to the horizontal over a bending device, the glass sheet being allowed to cool in the vertical run and during the bending process, directly applying heat to the sheet substantially along the line where it begins its horizontal run, to soften the sheet, and drawing the softened sheet horizontally from the bending device.

3. In a glass drawing apparatus in which a sheet of glass is drawn vertically and then bent over a bending roll, a gas pipe with a longitudinal series of perforations, placed closely above and substantially parallel with the roll, so that a continuous series of flames from the perforations will play on the horizontal run of the sheet as it leaves the roll, for the purpose described.

In testimony whereof I affix my signature.

FERNAND E. DEULIN.